Jan. 27, 1942.  L. J. KOCI  2,271,485
TOASTER
Filed June 26, 1939  6 Sheets-Sheet 1

Inventor:
Ludvik J. Koci
By
McCanna, Winter-
corn & Morelock
Attys.

Jan. 27, 1942.  L. J. KOCI  2,271,485
TOASTER
Filed June 26, 1939  6 Sheets-Sheet 5

Patented Jan. 27, 1942

2,271,485

UNITED STATES PATENT OFFICE 2,271,485

TOASTER

Ludvik J. Koci, Chicago, Ill., assignor to Chicago Flexible Shaft Company, Chicago, Ill., a corporation of Illinois Application June 26, 1939, Serial No. 281,080

20 Claims. (Cl. 219—19)

An object of the invention is the provision of a toaster having improved means for controlling the toasting interval, and for terminating the toasting operation including temperature responsive mechanism arranged to cooperate with other elements of the toaster to provide improved accuracy in the control of the toasting time.

Another object of the invention is the provision of an automatic toaster having improved means for varying the toaster interval to preselect the type of toast to be produced thereby.

A further object of the invention is the provision in an electric toaster of a temperature responsive control device having improved means for controlling the temperature responsive characteristics of the device. I have also aimed to provide an electric toaster having generally improved temperature responsive control mechanism.

A further object of the invention is the provision of a toaster having improved means for removing the finished toast therefrom, and for controlling such removal.

A still further object of the invention is the provision of a toaster having improved means for applying the heat to the bread, including improved heating element construction and improved means for spacing the bread from the heating elements.

A further object of the invention is the provision of an automatic toaster having improved operating functions whereby certain manual and automatic operations may be performed in conjunction with a control mechanism adapted to be selectively set for alternative functions. My invention provides control means operable in response to the setting of a control knob or device in either of alternative positions in one of which to automatically cause the toasted bread to be moved to a non-toasting position at the termination of the toasting operation or a predetermined event, and in the other of which to cause the toasted bread to be retained in the toasting position or in proximity thereto upon the happening of said event, independently of the functions of automatic toasting and manual movement of the bread carrier at will.

I have further aimed to provide a toaster having an oven of improved form and an improved arrangement of parts which greatly facilitates the manufacturing operations and thereby reduces their cost, which also improves the operating characteristics of the toaster and which simplifies repair operations.

Other objects and advantages will appear from the following description and the accompanying drawings, in which—

The invention contemplates a toaster of the general type shown in my copending application Serial No. 39,957, filed September 10, 1935, entitled Toaster and the like, now Patent No. 2,197,221, granted April 16, 1940, over which the present invention is an improvement. While the invention is described as embodied in a two slice automatic toaster adapted to simultaneously toast both sides of the bread slice, various phases of the invention are not so limited, as will be apparent from the description and the claims. To facilitate the description of the construction, the description will be divided into sections according to the functions of the parts, these sections being devoted to the frame and toasting elements, the bread inserting and removing mechanism, the temperature responsive control mechanism, and the casing or enclosing means.

*Frame and toasting elements*

Figure 7:
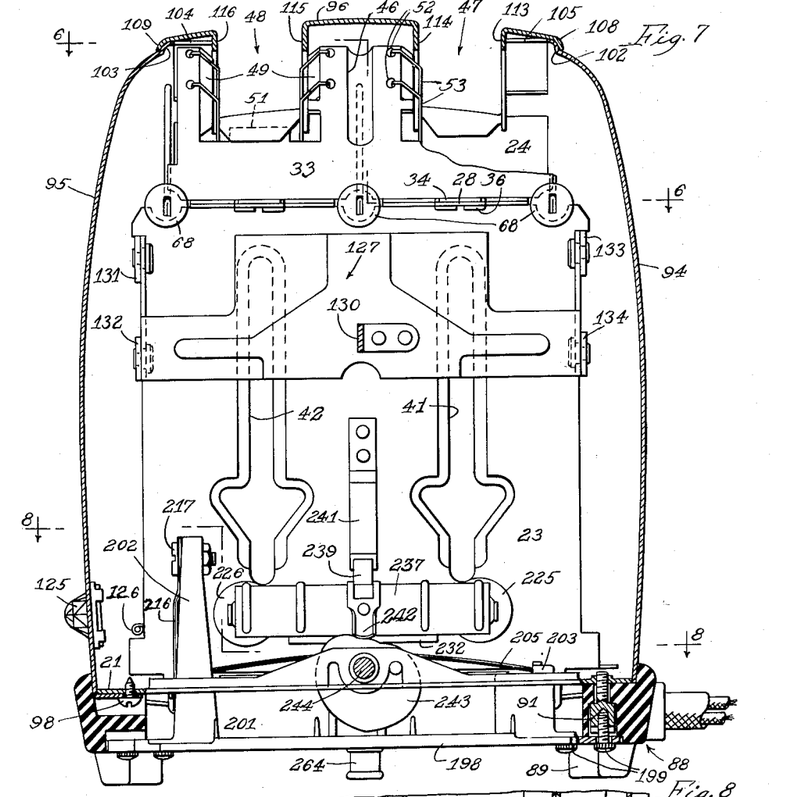
Fig. 7 is a section on the line 7—7 of Figure 1.
Figure 8:
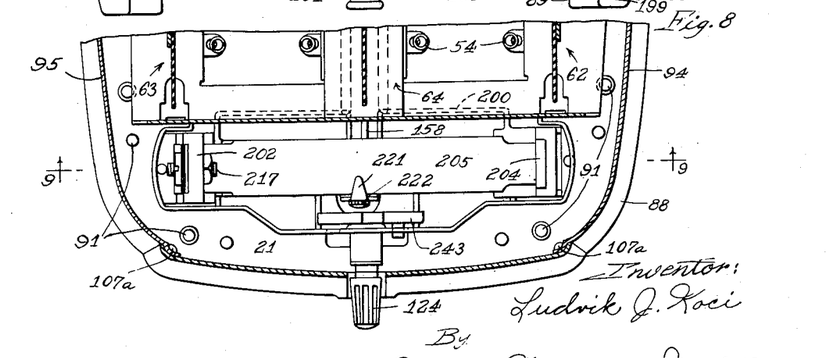
Fig. 8 is a view partly in section through one end of the toaster substantially on the line 8—8 of Fig. 7 showing the top of the temperature responsive control device.

The operating elements of the toaster are supported essentially upon a base plate 21 carried in the casing in a manner presently to be described. Positioned on this plate is a U-shaped frame having a bottom portion 22 parallel with the base plate 21 and upstanding end members 23 and 24. The frame member is secured to the base plate by a plurality of fingers 25 which extend through slots in the base plate and have their ends offset from the plane of the slot so as to prevent their removal. The bottom 22 and the end members 23 and 24 may be ribbed, as shown at 26 and 27, to lend rigidity thereto. Spaced ears 28 and 29 are formed on the upper ends of the end members 23 and 24 and project laterally outward. The upper ends of the end members are secured together by a bridge member 31 having vertically disposed end portions 32 and 33 provided with spaced ears 34 and 35 positioned to register with the ears 28 and 29 and having tabs 36 and 37 adapted to be bent over the ears 28 and 29 to secure the bridge member and the end members together. The side edges of the end member 24 are provided with flanges 38 and 39 for the pivotal support of bread carrying mechanism presently to be described while the plate 23 is provided with slots 41 and 42 and the plate 24 with slots 43 and 44 for the passage of bread transporting mechanism. The bridge member 31 is provided with a depending stiffening flange 45 on each edge thereof and with a centrally disposed stiffening rib 46. This bridge member is also provided with spaced slots as shown at 47 and 48, the side edges of each slot being beveled downwardly as shown at 49. Upstanding tongues 51 are positioned at each end of each of the slots 47 and 48 for engagement with the casing, as will presently appear. Spaced openings 52 are positioned along each side of the slots 47 and 48 and serve to receive toast guide wires 53 formed of spring wire, the wires having their upper ends hooked into the openings 52 and being trained over the beveled edges 49 (Fig. 7). These wires are of relatively small diameter and small mass so as not to materially obstruct the radiation of heat from the heating element to the sides of the slice of bread and to heat up at substantially the same rate as the bread, which slices are inserted through the openings 47 and 48 in a manner presently to be described and so that the presence of these wires will not produce a shadow on the surface of the toast. The wires extend downwardly, and adjacent their lower ends have coils formed therein as shown at 54 (Fig. 4), the coils forming in effect coiled springs which act to maintain the wires taut. The lower ends of the wires are passed through openings in laterally projecting tabs 55 positioned on opposite sides of slots 56 and 57 formed in the bottom member 22. The bottom member 22 is ribbed as shown at 58 and has offset flanges surrounding the slots 56 and 57 to lend rigidity to this member. At its center the bottom member also has spaced depending ears 59 and 61 adapted to support a part of the control mechanism, as will presently appear.

Figures 1, 2, 3:
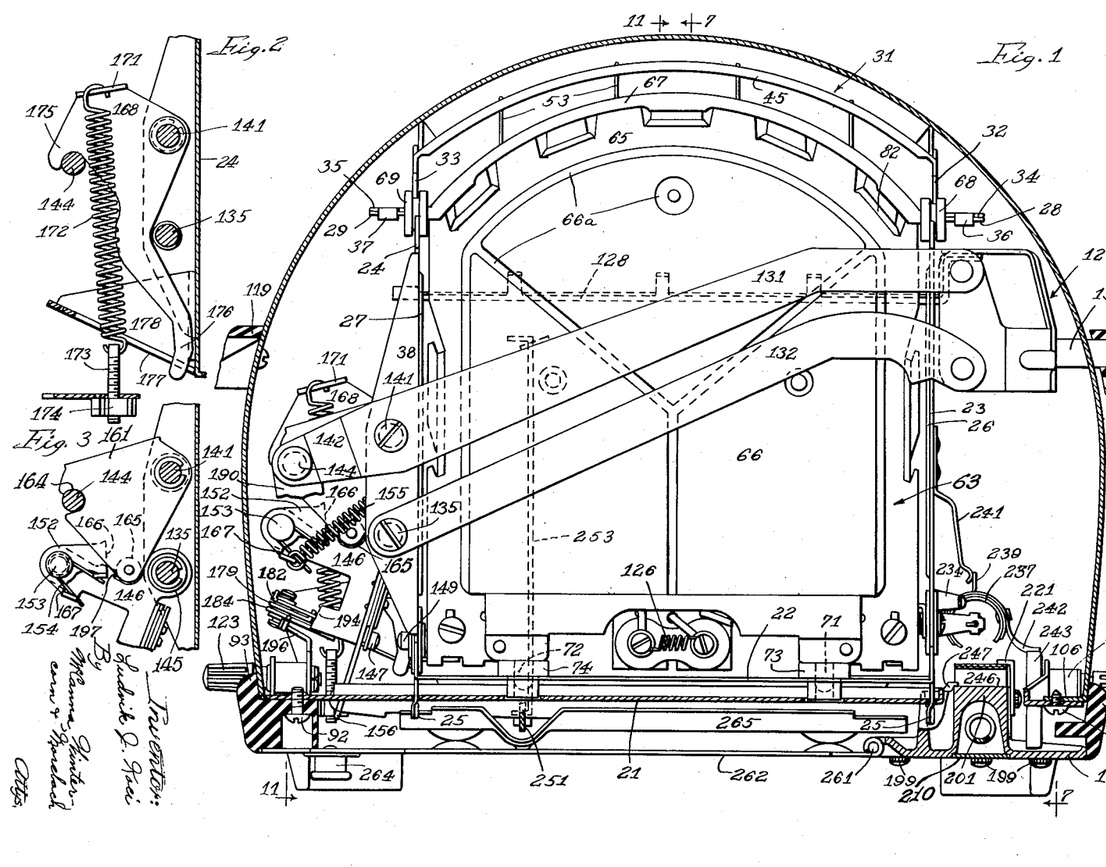
Figure 1 is a view partly in section taken in a plane along the inner surface of one of the casing side members substantially on the line 1—1 of Fig. 6, showing most of the operating parts in elevation.
Fig. 2 is a fragmentary view showing the position of the driving lever corresponding to that shown in Figure 1, and taken substantially on the line 2—2 of Fig. 11.
Fig. 3 is a fragmentary view showing the position of the switch lever corresponding to Figs. 1 and 2 and taken on the line 3—3 of Fig. 11.

Three heating elements are employed, in this instance designated generally by the numerals 62, 63 and 64, the elements 62 and 63 being substantially identical and comprising a sheet of insulation material 65 of mica or the like, to one side of which is attached, in spaced relation, a thin sheet of heat reflective metal such as aluminum, as shown at 66, dents and ribs 66a serving to space the main body of the sheet from the mica at the top thereof. The upper arcuate edge of the mica sheet is bound by a U-shaped strip of reinforcing metal 67, the ends thereof projecting beyond the mica sheet and being inserted in porcelain insulators 68 and 69 secured between the end members 23 and 24 and the bridge member 31. At the lower edge of the heating element the plate 66 has depending tabs 71 and 72 seated in insulators 73 and 74, which insulators are in turn seated in the bottom member 22, the heating element thus being supported on the frame structure by means of the insulators 68, 69, 73 and 74. The central heating element 64 comprises a mica sheet 75 which likewise has a binding strip 76 at its upper edge, the ends of which are seated in insulators 77 and 78 seated between the end members and the bridge member. The upper and side edges of each of the mica sheets 65 and 75 are provided with a plurality of notches as shown at 79 (Fig. 4) and along the lower edge thereof is a series of notches 81 within which notches is carried a winding of ribbon-like resistance wire, the wire being trained in loops between the notches 79 and 81. In the case of the heating elements 62 and 63 the resistance wire extends only across one face of the sheets 65 and extends across the back of the mica sheet between adjacent notches 79 and adjacent notches 81 as shown at 82 (Figure 1). In the case of the heating element 64, the loops 83 of the resistance wire are wound completely around the mica sheet 75 so as to produce spaced strands on opposite sides thereof. The notches are so positioned that the distance between the notches 79 is substantially greater than the distance between the notches 81 so that the loops spread as they extend upwardly to produce a sunburst effect. Through this means the radiant heat imparted to the surface of the slice of bread is given uniformity and compensation is produced for the effect of the rising heat on the bread. The loops of resistance wire 83 are held against the mica sheet intermediate their ends in the heating elements 62 and 63 by a transverse bar of mica 84 secured to the inner face of the sheet 65 by rivets 85. This construction of the heating element has a number of important advantages in that it greatly reduces the tendency of the resistance wire to fall away from the sheet of insulation, and in the case of the center toasting elements eliminates the necessity for a double sheet of insulation.

The central heating element has horizontal binding strips 86 on its opposite sides secured together by rivets 87 acting to hold the loops of resistance wire against undue sagging. Because of the vertical arrangement of the resistance wires, these binding strips may be horizontally positioned, which eliminates the tendency for the strips to produce shadows on the toast.

The casing

Figures 9, 10:
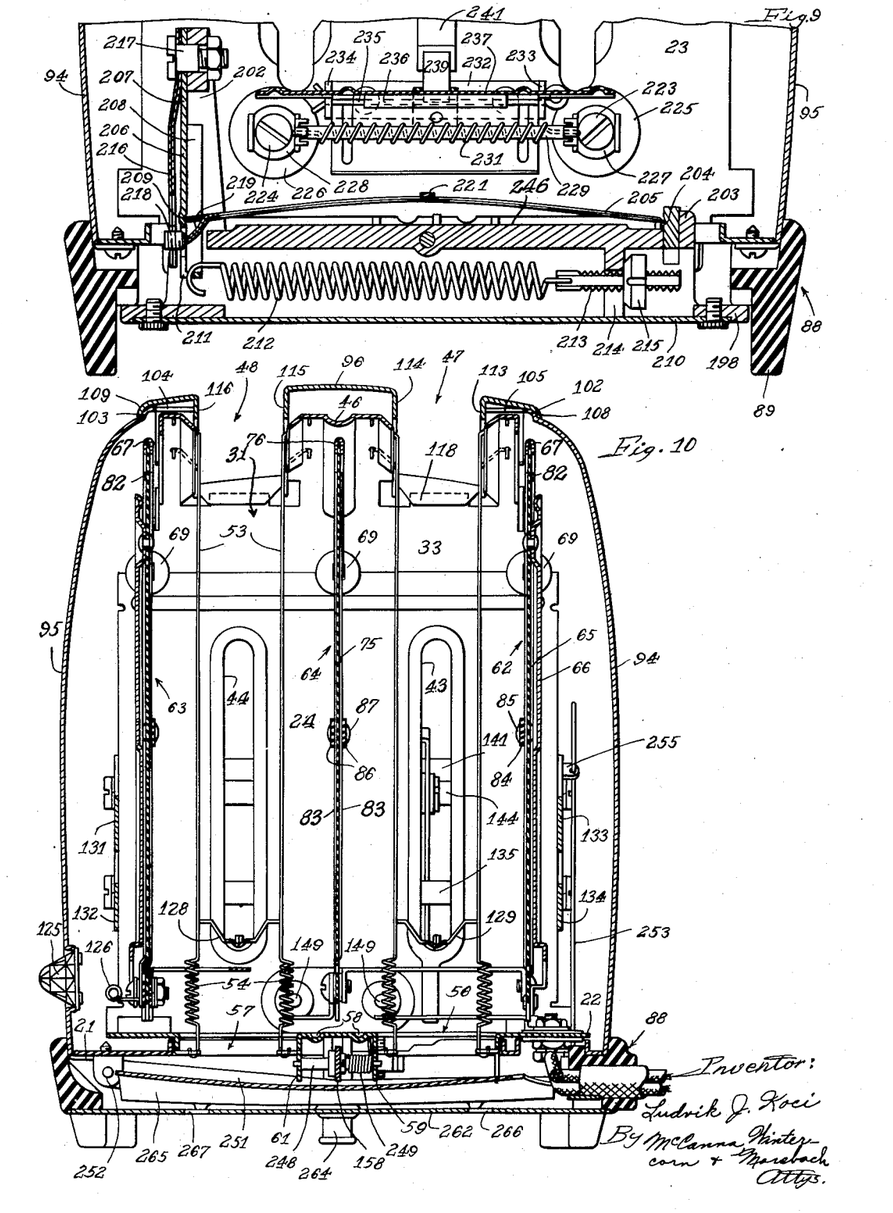
Fig. 9 is a fragmentary vertical section through one end of the toaster substantially on the line 9—9 of Fig. 8 showing the temperature responsive control mechanism.
Fig. 10 is a vertical transverse section substantially on the line 10—10 of Fig. 4.
Figure 11:
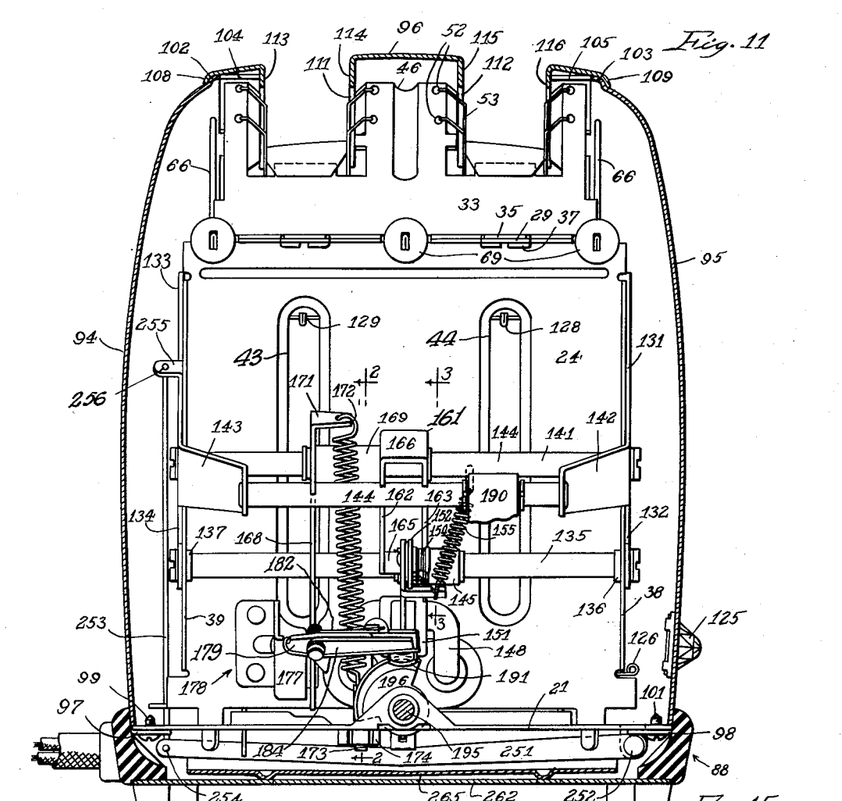
Fig. 11 is a sectional end view taken substantially on the line 11—11 of Figure 1.

The movable parts of the toaster, aside from the manually operated handles, are enclosed within a casing to form, in effect, an oven enclosed by the U-shaped frame, and end chambers at opposed ends of the oven. This casing includes a base designated generally by the numeral 88, in this instance formed of a form of synthetic resin such as "bakelite" or the like. The base 88 is provided with a plurality of depending legs 89 for the purpose of supporting the toaster in spaced relation to the table or other structure on which it is placed and is secured to the base plate 21 by means of a plurality of screws 91 of the type having a tapped and threaded head as shown in Fig. 7, the screws 91 being positioned adjacent one end of the toaster and by a plurality of plain screws 92 adjacent the opposite end of the toaster as shown in Figure 1. The upper side of the base member has an upwardly disposed peripheral flange 93 extending above the edge of the base plate 21 to conceal the junction between the base plate and the side walls. The side walls comprise two formed sheet metal side members 94 and 95 and a central or intermediate member 96 which extends in an arcuate fashion from end to end of the base 88 as will be seen from Figs. 1 and 4. The lower edges of the members 94 and 95 have inwardly disposed fingers 97 and 98 spaced therealong, which fingers extend inwardly below the base plate 21 (see Figs. 7 and 11), and are secured thereto by means of screws 99 and 101, these fingers supporting the side members in upright fashion. The sides 94 and 95 are provided with beads as indicated at 102 and 103 adjacent their arcuate upper edges, and also with a plurality of spaced inwardly extending spacing members 104 and 105 over the area defined by the bread receiving slots 47 and 48. Opposite ends of the central casing member 96 are likewise provided with laterally disposed fingers 106 which extend over the base plate 21 and are secured thereto by means of screws 107, shoulders 107a formed in beads 102 and 103 serving as stops to prevent distortion of the plate 21, the central member also having beads 108 and 109 on its opposed side edges complementary to the beads 102 and 103 on the side members, whereby when the central member is laid over the beads 102 and 103 and the ends drawn down by the screws 107, the side members are confined against lateral outward movement by the beads. The central casing member is provided with slots 111 and 112 registering with the slots 47 and 48 for the passage of the bread into and out of the toaster, the slots 111 and 112 having marginal side flanges 113 and 114, 115 and 116, respectively, for the purpose of concealing the upper ends of the guide wires 53 and the upper surface of the bridge member. The slots 111 and 112 also have depending marginal end flanges 117 and 118 (Figs. 1 and 4) which are positioned to engage against the upstanding tongues 51 to prevent endwise displacement of the central portion 96 through its intermediate area and to generally rigidify the toaster construction. The spacing members 104 and 105 are of such length as to abut against the flanges 113 and 116 as shown in Figs. 7, 10 and 11 to prevent the side members 95 and 96 from being displaced inwardly. A fixed handle 119 is secured to the central casing portion 96 by means of a screw 121, the handle being preferably formed of Bakelite or other insulation material and being complementary to a movable handle 122 at the opposite end of the toaster, the latter of which functions in the bread inserting and removing mechanism, as will presently appear. The central casing portion is also provided with slots for the passage of adjusting knobs 123 and 124 positioned adjacent the base 88. The side wall 95 has secured therein a signal lens 125 opposite to a coil 126 forming part of the heating element 63, which coil becomes incandescent when the heating elements are energized, causing light to be emitted through the lens 125 for the purpose of indicating when a toasting interval is in progress.

Bread inserting and removing mechanism

Positioned at one end of the oven and within the casing is a spider designated generally by the numeral 127 to which are attached a pair of bread holders 128 and 129 which extend through the openings 41 and 42 into the spaces between the heating elements, the free ends thereof extending out of the chamber through the openings 41 and 42. The handle 122 is carried on the spider 127 by means of a bar 130 which passes through a slot in the casing 96 for manual movement of the spider by means of the handle. The spider is supported for movement between initial bread inserting position as shown in Figure 1 and a toasting position as shown in Fig. 2 by means of parallel links 131 to 134 arranged in pairs along opposite sides of the frame. One end of each of the parallel links is pivotally secured to the spider 127, and the opposite ends of links 132 and 134 are secured to a shaft 135 rotatably mounted in bosses 136 and 137 formed in flanges 38 and 39 on the frame end member 24. The links 131 and 133 are likewise supported at points spaced from their opposite ends on a shaft 141 carried on the flanges 38 and 39 in a similar manner. The latter links project beyond the shaft 141 as shown at 142 and 143 and are interconnected at their ends by a rod 144. Positioned on the shaft 135 for rotation thereon is a sleeve 145 carrying a switch lever 146, which lever carries a pair of contacts 147 supported upon a U-shaped contact carrier 148 formed of resilient copper alloys such as phosphorbronze or the like, the contact carrier serving to conduct the current between the contacts 147. The contacts 147 are positioned to engage stationary contacts 149 which in turn are located in the circuit of the heating elements so that the closing and opening of the contacts 147 and 149 controls the flow of current through the toaster. The contact carrier is insulated from the switch lever by means of insulation 151 (Fig. 11). The switch lever 146 also carries a cam finger 152 rotatably secured thereon by means of a pin 153 and biased toward the position shown in Figs. 1 and 3 by means of a coil spring 154. A coil spring 155 acts between the switch lever 146 and the end member 24 (see Fig. 11) to normally rotate the switch lever in a clockwise direction facing Figs. 1 and 3, thereby to open the contacts 147 and 149. The switch lever also has a depending arm 156 provided with a slot 157 through which a trip lever 158 presently to be described more in detail, projects, the trip lever having a notch 159 adapted to engage the lower end of the slot 157 when the switch lever 145 reaches the closed position of the contacts as illustrated in Fig. 4, whereby to maintain the switch lever in the closed position against the tension of the spring 155, the switch lever moving to the open position of the contacts as shown in Figure 1 under the tension of the spring 155 upon rotation of the latch lever 158 to release the arm 156.

Figures 4, 5:
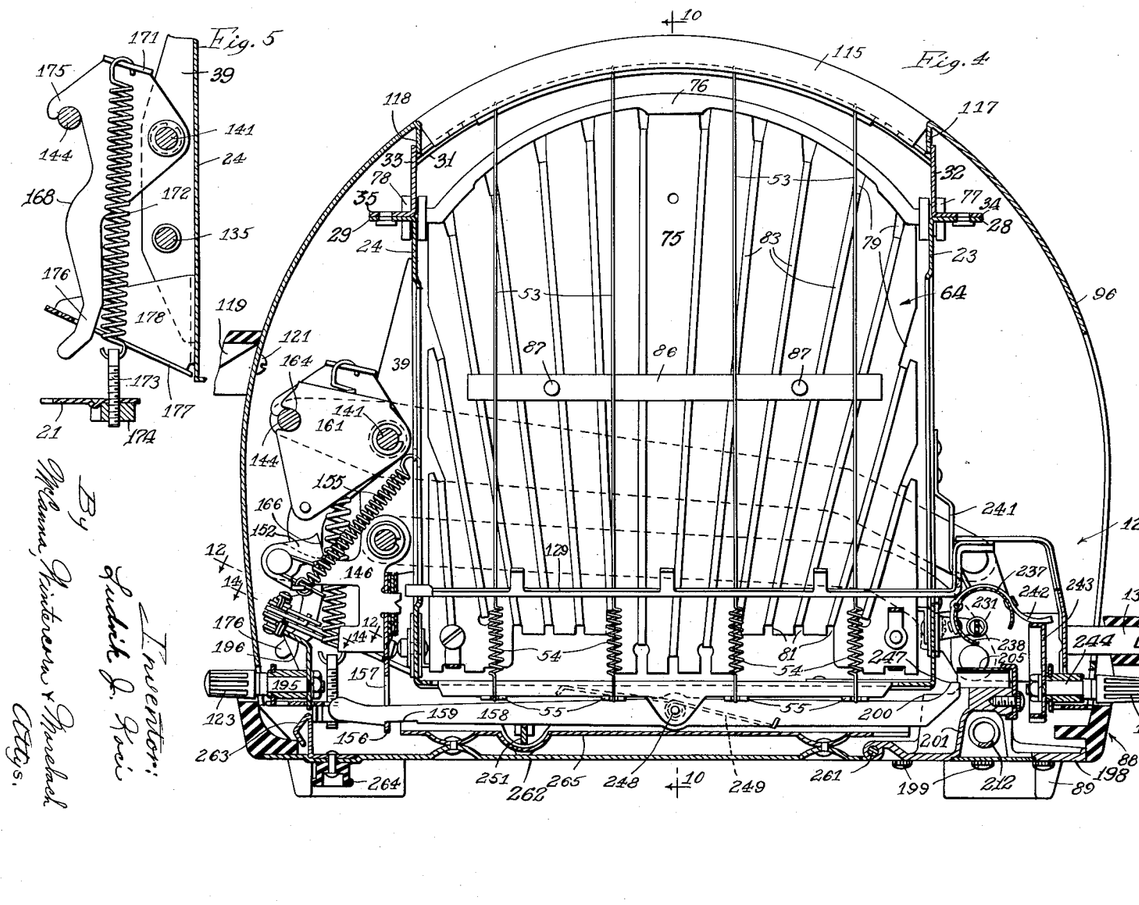
Fig. 4 is a vertical section taken longitudinally through the toaster substantially on the line 4—4 of Fig. 6 showing the position of the parts during the toasting interval.
Fig. 5 is a fragmentary view showing the position of the driving lever corresponding to that of Fig. 4.

In order to move the latch lever 146 from the open to the closed position, a bracket 161 is provided having side members 162 and 163 fixed to the shaft 141 and engaging the pin 144 in slots 164, the side members supporting a roller 165, the bracket and roller moving from the position shown in Figure 1 to that shown in Fig. 4 with corresponding movement of the spider 127. During the movement of the roller from the position shown in Figure 1 to the position of Fig. 4 the roller engages a cam surface 166 of the cam finger 152 thereby urging the finger in a counterclockwise direction facing Figs. 1, 3 and 4, causing counterclockwise rotation of the switch lever 146 because of engagement of a shoulder 167 of the cam finger with the lever 146. This clockwise movement of the switch lever 146 by means of the clockwise travel of the roller 165 brings the lever to a switch closing position in which the lower end 156 of the switch lever is latched to the trip lever 158, as shown in Fig. 4. The resiliency of the contact carrier permits the roller to pass beyond and clear of the cam finger 152 into the position shown in Fig. 4. The switch lever is latched in the switch closing position as heretofore described. The pivotal support of the cam finger 152 permits the spider 127 and the attached bracket 161 and roller 165 to be moved in the opposite direction, that is, in the direction to elevate the spider 127 without disturbing the latched position of the switch lever 146, the finger retracting against the tension of the spring 154 to permit the roller 165 to pass in said opposite direction without disturbing the latched condition of the switch lever 146.

Toast ejecting mechanism

Figure 14:
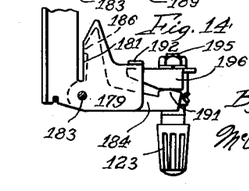
Fig. 14 is a fragmentary view of the latch mechanism taken on the line 14—14 of Figs. 4 and 11.
Figure 15:
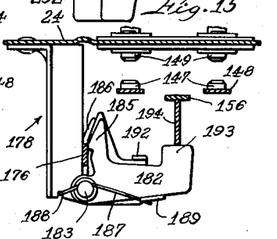
Figs. 15 and 16 are views similar to Figs. 12 and 14, respectively, showing adjusted positions of the parts.

For the purpose of ejecting toast, that is, raising the toast from the toasting position to the initial bread inserting position shown in Figure 1 in response to termination of the toasting interval, a driving lever 168 is rotatably supported on the shaft 141 by means of a sleeve 169 to which the lever is attached, the lever having a laterally disposed finger 171 for attachment of a driving spring 172, the opposite end of the driving spring being attached to the base plate 21 by means of a threaded pin 173 and nut 174 permitting adjustment of the tension of the spring. The driving lever acts to move the spider 127 from its lower to its upper position through a hook-like shoulder 175 positioned to engage the upper side of the pin 144 as shown in Figs. 2 and 5. The hook 175 and the driving lever are so shaped that when the lever is held in the position shown in Fig. 5, corresponding to the toasting position, by means presently to be described, the rod 144 is free to move downward away from the hook 175 in response to manual movement of the spider 127 upwardly so that with the parts in this position the spider may be moved upwardly so as to partly expose the toast at the top of the toaster for inspection without interrupting the toasting operation. The driving lever has a depending finger 176 positioned to move along the edge of a flange 177 of a latch bracket designated generally by the numeral 178 and attached to the end member 24 of the frame structure. The latch support 178 has a finger 179 provided with an edge 181 in spaced relation to the edge of the flange 177, the spacing being such as to receive the finger 176 in relatively close relationship as shown in Figs. 12 to 16, inclusive. A tripping pawl 182 is rotatably supported on the upper side of the latch support on a pin 183, and a selecting pawl 184 is likewise pivotally supported on the pin 183 on the lower side of the latch support. Each of these pawls are in the shape of bell crank levers, and the pawl 182 has a catch 185 on one end of the bell crank lever, while the pawl 184 has a catch 186 on the corresponding end thereof, positioned somewhat behind catch 185 as shown in Fig. 15 so as to be engageable after catch 185 has locked up. A spring 187 seats in a notch 188 of the latch support, one end thereof engaging a projection 189 on the pawl 182, and the other end thereof engaging an arcuate cam engaging surface 191 on the pawl 184, the spring acting to normally urge the pawls in a counterclockwise direction facing Figs. 12 to 16 and in a direction such that the catches 185 and 186 will project over the slot between the flange 177 and the edge 181 to engage the finger 176 of the driving lever. Counterclockwise rotation of the pawl 182 is limited by a stop 192 on the latch support portion 179. The pawl 182 has a projection 193 on the arm thereof opposite the catch 185 positioned to be engaged by a projection 194 on the switch lever 146 when the latter moves from the position shown in Fig. 4 to that shown in Figure 1 under the influence of the spring 155; in other words, substantially simultaneously with the opening of the contacts 147 and 149.

Figures 6, 17:
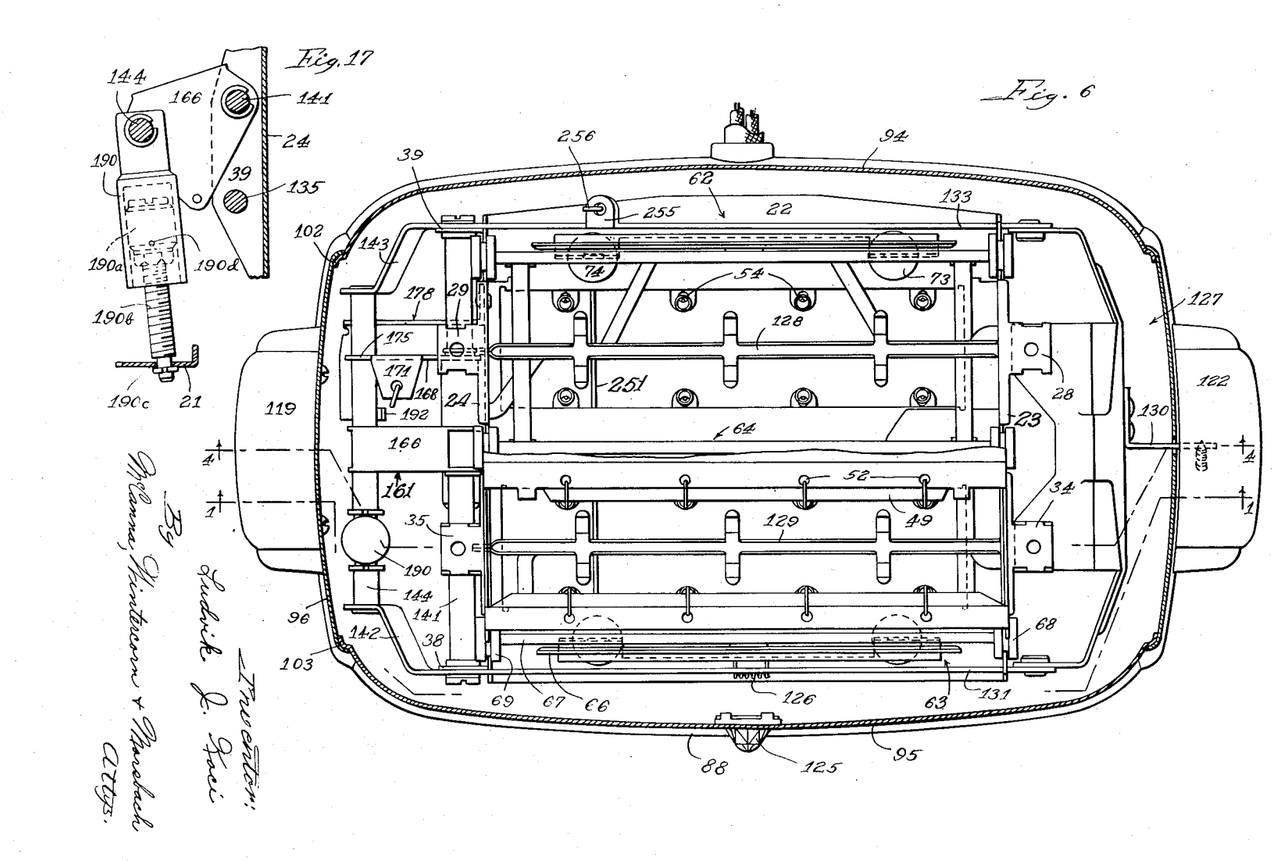
Fig. 6 is a horizontal view taken just inside the top of the casing and substantially on the line 6—6 of Fig. 7, the casing being shown in section, parts of the bridge member being broken away to show the bread positioning means.
Fig. 17 is a view of the dashpot.
Figure 12:
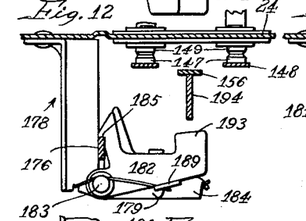
Figs. 12 and 13 are fragmentary views of the latch mechanism taken on the line 12—12 of Figs. 4 and 11, Fig. 12 corresponding to the position of the parts shown in Fig. 4, and Fig. 13 corresponding to the position of the parts shown in Figure 1.
Figure 13:
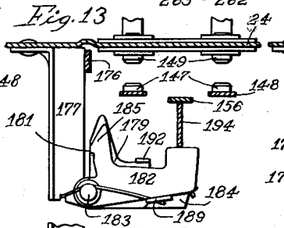

Thus, when the spider 127 is moved from its initial to its toasting position to carry a slice of bread into the oven, the rod 144 engaging the hook 175 rotates the driving lever against the tension of the spring 172, thereby moving the finger 176 from the position shown in Fig. 13 to the position shown in Fig. 12. Simultaneously the switch lever 146 moves from the position shown in Figure 1 to that shown in Fig. 4 to close the contacts 147 and 149, during which movement the projection 194 moves away from the projection 193 of the pawl 182 allowing the catch 185 to engage back of the finger 176 in the manner shown in Fig. 12, thereby retaining the driving lever in the tensioned position during the toasting interval. During this interval the spider 127 and toast racks may be raised for inspection of the toast without disturbing the position of the driving lever or the switch lever. When, however, the latch lever 158 is raised by either of the means presently to be described, the depending finger 156 is released from the notch 159 permitting the switch lever 146 to rotate under the influence of the spring 155, whereupon the contacts 147 and 149 open and the projection 194 engages the projection 193 of the pawl 182, rotating the same to release the finger 176, whereupon the spring 172 acts through the driving lever, the hook 175 and the rod 144 to elevate the spider 127 and toast racks back to the position shown in Figure 1. In order to cushion the action of spring 172 a dashpot, Fig. 17, is provided comprising a cylinder 190 having an opening, not shown, through which the rod 144 passes to pivotally carry the cylinder, a carbon piston 190a on a pin 190b having a loose fit in an opening 190c in the base plate 21. The cylinder has an opening 190d for the admission of air thereto at the end of the piston stroke corresponding to the toasting position of the spider.

Figure 16:
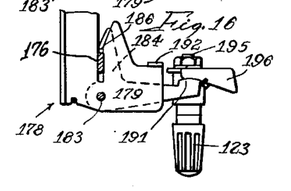

Means including the pawl 184 are provided, however, whereby the operator may select the type of operation just described or may cause the toast racks and spider 127 to remain in the lower or toasting position at the termination of the toasting interval. For this purpose the knob 123 is provided adapted for manual rotation of a pin 195 which carries within the casing a cam 196 positioned and shaped as shown in Figs. 14 and 16 to engage the cam engaging portion 191, whereby to rotate the pawl 184 between the position shown in Figs. 14 and 16 in response to rotation of the knob 123. When the pawl 184 occupies the position shown in Fig. 14, the operation of the toaster will be that above described and the toast racks will be moved to the elevated position at the termination of the toasting interval. On the other hand, when the knob 123 is turned to the position shown in Fig. 16 and the toast racks moved to the toasting position, the finger 176 of the spring-pressed driving lever 168 will be engaged behind the catch 186 of the lower pawl 184 and the driving lever will be retained in this position at the termination of the toasting interval. The driving lever will therefore be secured against rotation under the action of spring 172 in spite of the fact that the upper pawl 182 may be rotated so as to release the catch 185. In other words, the upper pawl 182 is ineffective to release the driving lever 168 when this pawl is actuated by the opening action of the switch lever 146 because at this time the lower pawl 184 is latched to said lever 168. The lower pawl 184, it will be observed, is not subject to release by the projection 194 on the switch lever 146. The toast will therefore be retained in the oven until removed by manual raising of the spider 127. In this position of the parts it will be seen that the spring 172 is ineffectual to maintain the spider and the toast racks in the elevated position and for this purpose a cam projection 197 is provided on the switch lever 146, this projection acting against the roller 165 in the open position of the switch lever to maintain the toast racks in the elevated position under the action of spring 155.

*Temperature responsive control mechanism*

Means are provided for predetermining the termination of the toasting interval, and includes a thermostat frame comprising a thermostat base plate 198 secured to the base 88 by means of a plurality of screws 199 engaging the tapped and threaded heads of screws 91, a rib-like portion 201 extending transversely of the toaster and terminating at one end in an upstanding post 202. Upstanding fins 200 extend to within close limits of the bottom end of end member 23 to exclude the passage of air into the end chamber and also to increase the cooling area of the plate 198. An upstanding boss 203 is provided on the opposite end of the rib 201 having a seat as shown at 204 for the reception of one end of a ply metal thermally responsive strip 205. The top surface of blade 205 is coated with a dull covering, preferably black, so as to be high heat absorptive and by this means I have found that more uniform results can be obtained. This coating should be dull, preferably black, a binder or vehicle capable of withstanding the high temperatures and flexing employed, one suitable material being that manufactured by Nubian Paint and Varnish Co. of Chicago, Illinois, under the name "No. 926 Black Cordovan." The post 202 has an inverted U shape with the open ends of the U integral with the remainder of the frame structure. Secured across the closed end of the U and depending therefrom is a plate 206 having a flexible portion 207 and a rigid portion provided with side flanges 208, the plate having a seat 209 to receive the opposite end of the thermostatic blade 205. The lower end of the plate has an opening 211 for the reception of the end of a spring 212 which seats within the hollow interior of the rib 201, the interior being normally closed by a cover 210 secured against the bottom of the plate 198 by means of screws. The opposite end of the spring 212 is seated in a screw 213 passing through a slot 214 in the thermostat frame and having a nut 215 on the screw bearing against the frame to adjust the tension of the spring 212 on the plate 206 and thereby adjust the stress of the thermostat blade 205. Also carried on the post 202 is a ply metal temperature responsive blade 216 secured thereon by means of a bolt and nut 217. The blade 216 extends downward along the plate 206 in spaced relation thereto and adjacent its lower end has an adjustment screw 218 adapted to bear against the tongue 219 struck from the thermostat strip 205 and extending downwardly and outwardly therefrom as shown in Fig. 9, the screw extending through the opening 211 of the plate 206. Thus the stress on the blade 205 is applied in part through the pivot seat 209 and in part through the tongue 219 from the blade 216, the stress from blade 216 being applied below the plane of the pivotal bearings 204 and 209 and having a lateral component. A finger 221 secured to the side of the rib 201 by means of a screw 222 restrains the strip 205 against excessive upward movement away from the rib under the tension of the spring 212.

The function of the thermostat member 216 is to change the stress on the blade 205 with change in temperature of the mass of the toaster and thereby compensate for changes in the duration of the toasting interval with changes in temperature of the main mass of the toaster. As the member 216 increases in temperature, as with repeated operations of the toaster, it applies more pressure against the tongue 219 which serves to increase the temperature at which the blade 205 snaps down and also at which it returns, though not to as great a degree. The increase in temperature at which it will snap down is desirable to compensate for changes in mass temperature, while the effect in the second position is for the purpose of reducing the time required for the blade to return, in other words to maintain a substantially uniform cooling time so that with successive toasting operations the cooling time may not become excessive. The last result is obtained by applying the pressure of the secondary thermostat 216 below the line connecting the two pivot points 204 and 209. By varying the position of the tongue 219, this effect may be varied as desired.

Seated against the end member 23 and secured thereto by means of screws 223 and 224 and insulated therefrom by insulating members 225 and 226 are brackets 227 and 228 which support the strip of insulation material 229 upon which is wound a resistance coil 231 which connects between the brackets 227 and 228, the resistance coil thus being connected into the circuit of the toasting elements to be energized therewith. A bracket 232 is secured against the end member 23 and has outwardly projecting ears 233 and 234 for the reception of a pin 235 passing through a sleeve 236 of an arcuate reflector 237 partly enclosing the resistance wire 231. The reflector 237 is in this instance shaped like a cylinder with a slot extending longitudinally of the cylinder, the resistance coil 231 extending longitudinally within the cylinder. The reflector is arranged with the slot or opening downwardly disposed but is capable of rotation about the pin 235, as will be apparent from Figs. 1 and 4, so that radiation from the resistance wire 231 may be directed substantially entirely against the strip 205 or away therefrom and also so that the strip may be partially shielded from such radiation by the inner edge 238 of the reflector. The reflector has an upwardly disposed tab 239 positioned to be engaged by a spring 241 attached to the frame end member 23 and normally tending to rotate the reflector in a clockwise direction facing Figs. 1 and 4. The reflector also has a cam follower 242 projecting outwardly and downwardly therefrom toward the adjacent side of the casing and adapted to contact a cam 243 carried on a pin 244 supported in a bearing 245 attached to the base plate 21, the pin extending through the casing and carrying the knob 124. The follower 242 is urged against the cam by the spring 241 whereby upon rotation of the knob 124 the reflector will be rotated about its pivot points, shielding the strip 205 to a greater or lesser extent; and thereby varying the period of time required for the heating coil 231 to bring the strip to the temperature at which it will move to its opposite position. The plate 198 and rib 201 are preferably made of metal of high heat capacity and high heat conductivity, and the rib is provided with a flat metal surface 246 opposite the strip 205. The strip is so arranged that at a predetermined elevated temperature, depending upon the stress imparted thereto by the spring 212 and thermo element 216, it will move from the position shown in the drawings to a position in surface contact with the flat surface 246, in which position the heat is rapidly drained from the strip for the purpose of cooling the same. When the strip reaches a lower temperature, varied by the temperature of the strip 216, it moves back to the position shown in the drawings, each of said movements being abrupt or snap movements.

Upon movement of the strip downward against the surface 246 it engages an end 247 of the lever 158, which lever is supported on a pin 248 between the ears 59 and 61, a coil spring 249 acting to normally maintain the end 247 in an elevated position as shown in Figs. 1 and 4, except when depressed by the action of the ply metal strip 205, as just described.

A lever 251 is pivotally supported at one end on the plate 21 as shown at 252 and extends transversely beneath the plate, as best shown in Fig. 11, the opposite end of the lever having pivotal connection with a rod 253 as shown at 254, the rod 253 extending upwardly along the side of the frame and through an ear 255 on the link 133. The rod is bent through an angle of about 90° adjacent its ends to provide a laterally disposed portion 256 above the ear 255 whereby when the spider 127 is moved to its extreme elevated position, the ear 255 engages against the portion 256 of the rod, lifting the rod and thereby rotating the lever 251 causing the upper edge thereof to engage the lever 158 to trip the switch lever 146. However, the rod 253 and ear 255 permit of movement of the spider substantially to its topmost position without actuation of the lever 251 so that the contents of the toaster may be examined during the toasting interval without tripping the switch lever 146.

Secured to one edge of the thermostat base plate 198 by means of a pivot pin 261 is a bottom cover 262 extending across the bottom of the toaster and having finger 263 which engages the base to retain the cover in closed position. A knob 264 facilitates opening of the cover. Secured to the upper side of the cover is a curved crumb tray and baffle 265 which serves to collect crumbs dropping from the toast and to divert the ventilating air entering through the cover by way of slots 266 and 267. It will be seen that by opening the bottom the levers 158 and 251, the switch and the ejecting mechanism are directly exposed for examination or repair and by removing the screws 199 the thermostat may be removed, rendering substantially all parts likely to need repair or attention immediately accessible.

The thermostat mechanism is claimed in my divisional application Ser. No. 293,028, filed September 1, 1939, now Patent No. 2,254,687, granted September 2, 1941. The subject matter of the electric toaster heating units is claimed in a divisional application Serial No. 424,378, filed December 26, 1941, and the subject matter of the toaster bread spacing wires is claimed in a divisional application Ser. No. 424,379, filed December 26, 1941.

*Operation*

The operation of the toaster is as follows: Assuming the parts to occupy the position shown in Figure 1, one or two slices of bread are inserted through the slots 47 and 48 to rest upon the racks 128 and 129. The handle 122 is then depressed causing rotation of the links 131 to 134 and simultaneous rotation of the shafts 141 and 135. During this rotation the roller 165 engages the cam finger 152 rotating the switch lever 146 and closing the contacts 147 and 149 and causing the finger 156 to engage in the notch 159 of the lever 158, thereby latching the switch lever in its closed position. Simultaneously the rod 144 engages the hook 175 moving the finger 176 into the position shown in Fig. 12, the finger displacing the pawl catch 185 during this movement and the catch dropping in behind the finger to prevent its return movement.

Upon closing of the contacts 147 and 149 the toasting elements are all simultaneously energized and current is caused to flow through the resistance coil 231 from which heat is radiated to the ply metal strip 205. When this strip is heated to a predetermined temperature, it snaps down against the surface 246 engaging the end 247 of the lever 158, whereupon the finger 156 moves to the position shown in Figure 1, opening the contacts 147 and 149 and de-energizing the toasting elements, the thermostat heating coil 231, and the lamp coil 126. The rate at which the thermostat reaches said temperature, and consequently the toasting interval and the color of the toast, is determined by the setting of the knob 124.

The knob 123 may be set in the position shown in Figs. 15 and 16 so that at this point the toasting operation is completed and no further action results until the operator raises the handle 122, in which instance the toast will remain in the oven in the normal toasting position until manually removed therefrom for the purpose of further drying the toast and producing the so-called Melba type toast. On the other hand, by moving the knob 123 to the position shown in Fig. 14, opening of the switch lever 146 causes the projection 194 to engage the pawl 182 releasing the finger 176, whereupon the spring 173 causes rotation of the driving lever 168 and consequent movement of the spider and toast racks upward to the position shown in Figure 1, causing the upper portions of the toast to project from the oven so that they may be removed without further manual operation on the part of the operator.

Attention is directed to the novel features of the invention, among which should be noted the novel construction of toasting elements wherein the resistance wires are arranged in what might be termed a sunburst fashion, the wires diverging from bottom to top of the toasting element to produce uniform toasting effect throughout the width and height of the toast. It should also be noted that it provides a novel form of bread guiding device for guiding the slices and for holding them in vertical position during the toasting interval, the guides being arranged to substantially prevent the production of shadow on the toast. It should further be noted that the toast racks and spider are connected and supported solely upon pivotal bearings while the racks move vertically in the oven, thereby eliminating the difficulties due to sliding bearings.

A further advantage of my improved construction lies in the improved thermostat control means and in the improved means for adjusting and varying the response thereof in order to vary the toasting interval. Another novel feature of the invention lies in the improved means for inserting and removing the toast from the oven, and the provision of improved mechanism selectively operable either to maintain the toast within the oven or to eject the toast upon termination of the toasting interval. Attention is also directed to the improved casing construction wherein the casing consists of three sections which can be formed without welding or analogous operations, and wherein the means for holding these sections together is entirely concealed within the toaster.

While I have described and illustrated a specific embodiment of the invention, this is by way of illustration and not limitation, and I do not wish to be limited except as required by the prior art and the scope of the appended claims, in which—

I claim:

1. The combination in a toaster of a heating element, means for transporting bread between a remote position and a toasting position opposite said heating element, a spring pressed switch for controlling the flow of current through said element, a spring pressed lever for moving said transporting means from the toasting to the remote position, means for closing the switch against its spring pressure and moving said lever to a tensioned position in response to movement of said transporting means to the toasting position, latch means for retaining said switch in the closed position, latch means for retaining the said lever in the tensioned position, means for predetermining a toasting interval and for tripping the switch latch at the termination of a toasting interval, and means for tripping the lever latch subsequent to the tripping of the switch latch to move the transporting means to the remote position.

2. Combination recited in claim 1 wherein an additional latch means is provided manually operable to engage said lever to prevent movement thereof in response to termination of the toasting interval or to permit said movement.

3. The combination in a toaster of a casing comprising a base member, spaced side walls each having an edge adapted to seat under said base, an upwardly extending curved edge and a bead at said curved edge, and a central member having end portions adapted to seat on said base, arcuately curved edges adapted to seat over said beads to prevent divergence of said side members, at least one bread-receiving slot midway between the ends thereof and inwardly extending flanges annularly of said slots, said side members having laterally disposed fingers positioned to engage said flanges to prevent approach movement of the side members, inwardly projecting tabs on the ends of said central portion, and screws passing through the base and engaging said tabs to draw said central portion tightly against said side portions.

4. The combination in an electric toaster of a plurality of toasting elements, end members at opposite ends of said elements defining an oven, a casing overlying the oven in spaced relation to said end members defining a control chamber at one end of the oven and a second chamber at the opposite end thereof, control means located in said control chamber for measuring a toasting interval, actuating means located in said second chamber for terminating the toasting interval, and lever means extending between said chambers for actuating said actuating means in response to movement of the control means to terminate the toasting interval.

5. The combination in an electric toaster of a plurality of toasting elements, end members at opposite ends of said elements defining an oven, a casing enclosing said end members defining a thermostat chamber beyond one end of the oven and a switch chamber beyond the opposite end thereof, temperature responsive means located in said thermostat chamber adapted to move in opposite directions upon heating and cooling to control the toasting intervals, switch means located in said switch chamber for controlling the flow of current through the toaster adapted to be latched in a closed position for the duration of a toasting interval, and lever means extending between said chambers arranged to unlatch said switch in response to heating of said temperature responsive means.

6. The combination in an electric toaster of a plurality of toasting elements, end members at opposite ends of said elements defining an oven, a casing enclosing said end members defining a thermostat chamber beyond one end of the oven and a switch chamber beyond the opposite end thereof, bread transporting means, means in said switch chamber for actuating said bread transporting means, switch means in said switch chamber for controlling the flow of current through the toaster, temperature responsive means in said thermostat chamber for controlling said switch to terminate the toasting interval, means for limiting the flow of air through said thermostat chamber to prevent cooling action thereof on said temperature responsive means, and means for directing a cooling draft of air through said switch chamber to cool said switch and said actuating means.

7. The combination in a vertical type electric toaster of a plurality of toasting elements defining an oven, a toast carrier extending into the oven from one end thereof, and movable vertically therein between an elevated initial position and a lowered toasting position, a handle at said end of the oven supported on said carrier for moving it between said positions, parallel links disposed on opposite sides of said oven having pivotal connection with said carrier and constituting the sole means for support thereof, means for pivotally supporting said links at the end of said oven opposite from said handle, one link of each pair having a portion extending beyond said pivotal support, means connecting said extending portions, and spring means tensioned by movement of the carrier to the toasting position acting on said last mentioned means to return the carrier to the initial position.

8. The combination in a toaster of a frame structure having spaced end members, a plurality of heating elements disposed therebetween defining an oven, a casing seated over said frame structure defining an end chamber between the casing and an end member, and a self-contained temperature responsive control unit shaped to seat across the bottom of said end chamber and project therein to control the operation of the toaster, said unit being insertable and removable from the bottom of the toaster as a unit to facilitate the test assembly and repair thereof, and a bottom plate for the toaster hinged to said control unit and removable therewith.

9. In an automatic toaster, in combination, an electric toasting element, a bread carrier, manually operable means for moving the bread carrier between toasting and non-toasting positions, means for automatically toasting the bread at the toasting position in response to movement of the bread carrier to said position, spring means for automatically moving the bread carrier from the toasting position to the non-toasting position in response to termination of the toasting, control means adapted to be set by the operator to render the third described means only inoperative to perform its function without interfering with the functioning of the first and second described means, and means for tensioning said spring in response to movement of the bread carrier to the toasting position.

10. An automatic toaster having a toasting element, a bread carrier movable between a toasting and a non-toasting position with relation to the toasting element, switch means movable between open and closed positions to initiate and terminate a toasting interval, means for automatically moving the bread carrier from the toasting position to the non-toasting position upon termination of the toasting, control means adapted to be set in alternative positions, one for causing the first named means not to function upon termination of the toasting and the other to cause it to function, manually operable means to move the bread carrier between said toasting and non-toasting positions independently of the functioning of said control means and means for closing said switch in response to movement of the carrier to toasting position to initiate a toasting interval regardless of the position of said control means.

11. An automatic toaster having an electric toasting element, a bread carrier, manually operable means to effect movement of the bread carrier from a toasting to a non-toasting position with relation to the toasting element, means for automatically toasting the bread at the toasting position in response to movement of the bread carrier to said position, and control mechanism having a control member adapted to be set in either of alternative positions and means whereby the bread carrier will be automatically moved from toasting to non-toasting position at a predetermined event in response to the setting of said member at one of its said positions and whereby the bread carrier will be retained in said toasting position at said predetermined event in response to the setting of said member in said other alternative position without interfering with the operativeness of the first and second mentioned means to perform their respective functions.

12. In a toaster, an electric toasting element, a bread carrier, a manually operable lever for moving the bread carrier to toasting and non-toasting positions with relation to the toasting element, a switch for controlling the current to the toasting element biased to open position, means operated by movement of said lever to close the switch when said lever is moved to the toasting position to initiate a toasting interval, a driving lever for moving the bread carrier to non-toasting position, a latch device for holding the driving lever against operation to perform its described function during said toasting interval for independent operation of said manually operable lever, and means actuated by opening movement of the switch to release said latch device.

13. A toaster as set forth in claim 12, including means for optionally rendering the driving lever operative or inoperative to perform its described function.

14. In a toaster, in combination, an electric toasting element, a bread carrier, means for moving the bread carrier from a toasting to a non-toasting position with relation to the toasting element, a switch for controlling the flow of current to the toasting element, means for latching the switch closed by operation of moving the bread carrier to the toasting position including a latch release member, a thermostat device adapted to actuate said latch release member at a predetermined thermostat action to open the switch, spring-pressed means adapted to move the bread carrier to the non-toasting position, a latch device to hold said spring-pressed means against operation to perform the function described, and means actuated by opening movement of the switch to release said latch device.

15. In an automatic toaster, an electric toasting element, a bread carrier, means for moving the bread carrier to toasting and non-toasting positions with relation to the toasting element, a thermostat device to control the toasting interval including a ply metal thermostat and a member adapted to be actuated by said thermostat at a predetermined event, a switch for closing the toasting element circuit biased to open position and adapted to be latched in closed position by said member and unlatched by actuation of said thermostat, means for moving the bread carrier to the non-toasting position restrained from the said function by a latch device, and means actuated by opening movement of the switch to release said latch device.

16. In a toaster, in combination, an electric heating element, a bread carrier, manually operable means to effect relative movement between the heating element and the bread carrier between toasting and non-toasting positions, a circuit for the heating element including a switch adapted to be closed for toasting, means to automatically open the switch to terminate the toasting at a predetermined event, a spring-pressed lever operative on said carrier for effecting relative movement between the heating element and the bread carrier from toasting to non-toasting position, means for moving said lever to tensioned position in response to movement of said carrier to toasting position, a latch device for holding said lever against operation on said carrier to perform the described function, and a control device adapted to be set by the operator in alternative positions one for causing the latch device to automatically release said lever approximately at the termination of the toasting operation and another for causing the latch device to hold said lever against performance of its said function at said termination of the toasting operation without interfering with the function of said manually operable means.

17. A toaster as set forth in claim 16, in which the manually operable means serves to automatically close the switch when moved to the toasting position regardless of the position of said control device, and in which the action of the switch in moving to the open position serves to release the latch device to automatically effect movement to the non-toasting position.

18. A toaster as set forth in claim 16, in which the control device includes a second latch device adapted to hold the spring-pressed lever against operation to perform its described function when the control device is set in the second alternative position, and in which the control device further includes a manually adjustable knob adapted to be selectively set in positions corresponding with said alternative positions to control the operation of the latch devices.

19. The combination in a toaster of a heating element, manually operable means for transporting bread back and forth between a non-toasting position and a toasting position opposite said heating element, a switch for controlling the flow of current to said heating element, means for opening said switch in response to termination of a toasting interval, driven means for moving said transporting means from said toasting position to said non-toasting position in response to termination of a toasting interval, a latch device acting on said driven means for restraining the same against moving said transporting means, the transporting means being disconnected from said driven means for manual operation independently of said driven means, means selectively operable in one position for rendering said latch device inoperative for automatic movement of the transporting means to said non-toasting position in response to termination of the toasting interval and in another position to render said latch device operative to restrain said driven means, and means for closing said switch in response to movement of said transporting means to non-toasting position regardless of the position of said selectively operable means to initiate a subsequent toasting interval.

20. The combination in a toaster of a heating element, means for transporting bread between a remote position and a toasting position opposite said heating element including a spring, switch means for controlling the flow of current through the toaster, means for closing the switch and tensioning said spring upon movement of said transporting means to the toasting position, said transporting means being manually movable between said positions independently of said spring, means for moving the switch to the open position and releasing the tension on said spring in response to the termination of a toasting interval, to terminate the flow of current to the heating element and move the toast to the remote position, and means selectively operable to prevent release of the tension on the spring in response to the termination of the toasting interval to retain the toast in toasting position after termination of the flow of current to the heating element, said transporting means being operative on said switch closing means regardless of the condition of said selectively operable means.

LUDVIK J. KOCI.